340-870.14 SR
XR 2,799,727

July 16, 1957 C. A. SEGERSTROM 2,799,727

ELECTRONIC COMMUTATED CHANNEL SEPARATORS

Filed Nov. 8, 1952 6 Sheets-Sheet 1

INVENTOR
CARL A. SEGERSTROM
BY Elmer J. Gorn
ATTORNEY

2799727
OR IN 179/15A

ELECTRONIC COMMUTATED CHANNEL SEPARATORS

Filed Nov. 8, 1952

INVENTOR
CARL A. SEGERSTROM
BY Elmer J. Gorn
ATTORNEY

ELECTRONIC COMMUTATED CHANNEL SEPARATORS

Filed Nov. 8, 1952 6 Sheets-Sheet 3

INVENTOR
CARL A. SEGERSTROM
BY Elmer J. Gorn
ATTORNEY

July 16, 1957 C. A. SEGERSTROM 2,799,727

ELECTRONIC COMMUTATED CHANNEL SEPARATORS

Filed Nov. 8, 1952 6 Sheets-Sheet 4

INVENTOR
CARL A. SEGERSTROM

BY Elmer J. Gorn
ATTORNEY

ELECTRONIC COMMUTATED CHANNEL SEPARATORS

Filed Nov. 8, 1952 6 Sheets-Sheet 5

INVENTOR
CARL A. SEGERSTROM
BY Elmer J. Gorn
ATTORNEY

INVENTOR
CARL A. SEGERSTROM
BY Elmer J. Gorn
ATTORNEY

United States Patent Office 2,799,727
Patented July 16, 1957

2,799,727

ELECTRONIC COMMUTATED CHANNEL SEPARATORS

Carl A. Segerstrom, Winchester, Mass., assignor to Raytheon Manufacturing Company, Newton, Mass., a corporation of Delaware Application November 8, 1952, Serial No. 319,448

14 Claims. (Cl. 179—15)

Figure 1:
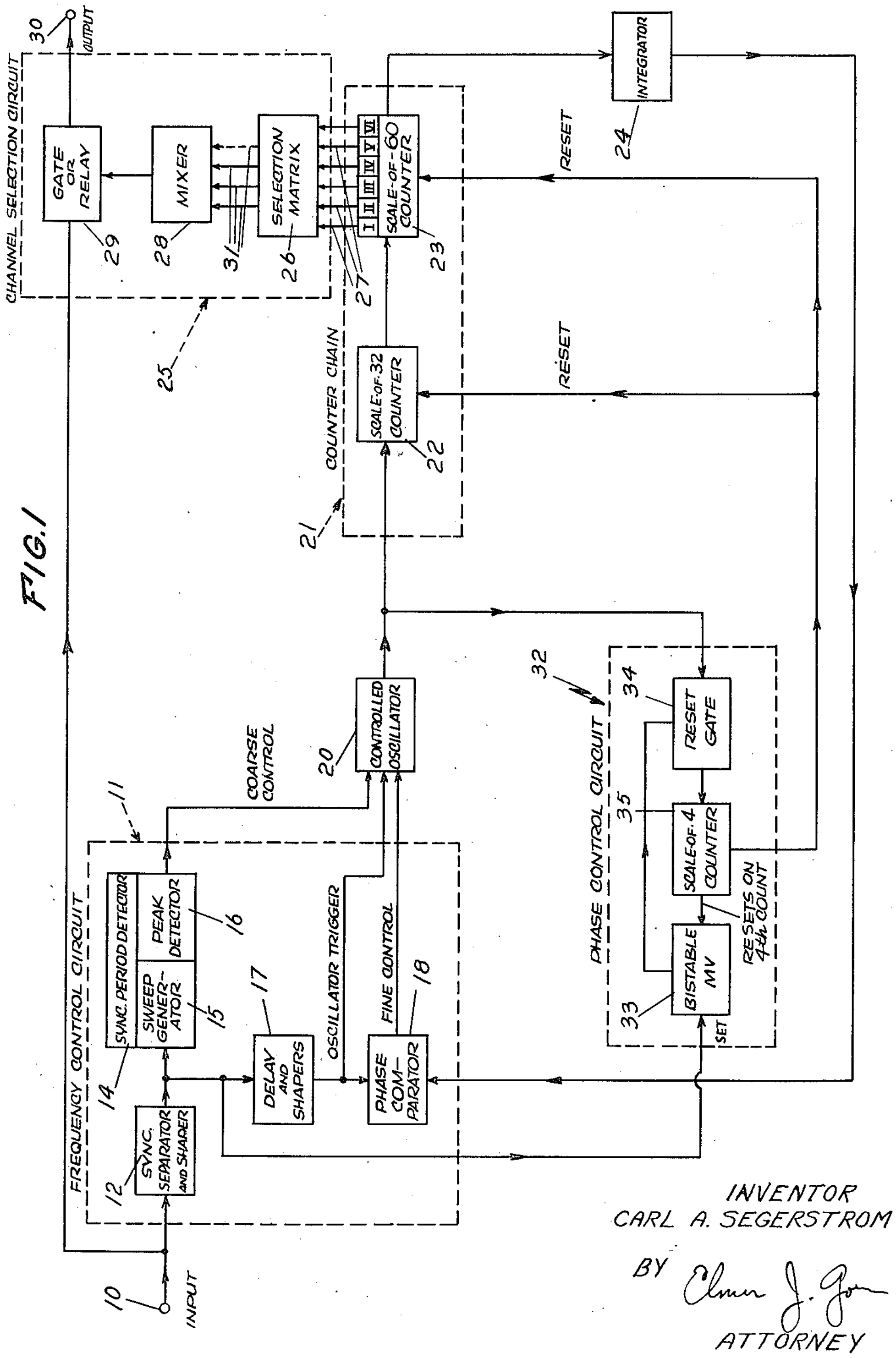

This invention relates to a continuous wave electronic commutated channel separator adapted to selectively transmit to the output terminals one or more channels of information from the total number of channels contained in a commutated channel input.

Commutation in a remote transmitting equipment may be accomplished by a rotary commutator having a number of segments $n$ equal to the number of channels of information available and driven at a speed which may be, for example, of the order of four to eight revolutions per second. One segment of the commutator is connected to a constant negative voltage used for synchronizing purposes, while the remaining segments are connected to the positive signal outputs of the various channels. The remote receiver output for each frame or revolution of the commutator thus consists of negative synchronizing pulses recurring at a frequency of the order of four to eight pulses per second and between each adjacent synchronizing pulse $(n-1)$ equally spaced positive amplitude modulated signal pulses. The amplitude of each positive signal or channel pulse corresponds to the signal from one commutated channel.

In order to selectively separate a desired channel or channels from the $n$ channels available, the frame period between synchronizing pulses is divided into $n$ equal time intervals, any of which may be selected and used to gate out the pulse corresponding to that channel. Since the synchronizing period is continually changing owing to variations in speed of the remote mechanical commutating switch, the division of the frame synchronizing period into $n$ equal time intervals is difficult.

One system for selecting one or more desired channels contained in the commutated channel output of a continuous wave telemetering system is described and illustrated in an application, Ser. No. 321,754 of Segerstrom et al., filed November 21, 1952. In this system of Segerstrom et al., the input signal containing the $n$ channels is first introduced into a synchronizing separator circuit which separates out the synchronizing pulses. The period of the synchronizing pulse is next converted into a voltage by means of a period detector which is used as a frequency control for an oscillator whose frequency is thus maintained at substantially $m$ times the frame synchronizing period. The controlled oscillator output is counted down by a factor of $m$ by means of a counter chain so that the output of said counter has a frequency substantially equal to the frame synchronizing pulse recurrence rate. The channel separator further comprises a counter-matrix circuit driven by the controlled oscillator. By proper matrix connections to the controlled divider, it is possible to generate gate pulses at the correct times necessary to select the data corresponding to a given commutator segment. In the application shown here, as many as $n-1$ channels (the exact number depending upon the matrix arrangement) may be separated out simultaneously and brought out sequentially over one lead. The selected amplified gate pulses from the matrix corresponding in time to the desired channel(s) to be transmitted operates a gate circuit, such as an electronic gate or a high speed electromechanical relay, which allows only the desired channel or signal pulses to reach the output terminals of the channel separator.

In many applications, the frequency of the incoming synchronizing pulses may vary considerably owing to unusually poor regulation of the commutating switch, the effect of gradual deterioration of the battery driving the commutator, and so forth. When the frequency of the incoming frame synchronizing pulses changes, the synchronizing pulses will not coincide with the change of state in the last stage of the counter chain. This may result in the channel matrix gate for a given channel deviating more than a channel period from the actual channel pulse, rendering the channel separator unreliable. It has been found that, in such application where the synchronizing period is widely fluctuating, the frequency control voltage derived in the system described in the aforesaid application to Segerstrom et al. is inadequate to maintain the controlled oscillator frequency sufficiently constant to achieve the desired degree of synchronizing between the desired channel gate pulses and the channel data.

In order to fully compensate for discrepancy in phase between the counted-down signal from the last counter stage and the corresponding synchronizing pulse, a fine frequency control circuit has been incorporated as a part of this invention. In order to obtain this fine frequency control of the controlled oscillator, the counted-down signal from the counter output is compared directly with a corresponding frame synchronizing pulse in a phase comparator circuit, and the resulting fine frequency control or error voltage derived therefrom maintains the frequency of the controlled oscillator at almost exactly $m$ times the frame synchronizing period.

It is desirable, in order to maintain the accuracy of the system, to correct the phase of the counter chain once during each frame. If the frame synchronizing period increases sufficiently because of an instantaneous decrease in speed of rotation of the mechanical switch, the synchronizing pulse may lead the corresponding output pulse from the counter. In the event that the frame synchronizing pulse thus arrives before the last channel and the counter reset were applied directly to the counter coincidentally with the synchronizing pulses, as in the aforementioned application to Segerstrom et al., the phase comparator or fine frequency control circuit would be rendered inoperative.

In order to obtain phase comparison between the synchronizing pulse and the corresponding counter output pulse, regardless of whether the frame synchronizing period is increasing or decreasing, the synchronizing pulses are delayed by an auxiliary counter before application to the reset circuits of the main counter chain. In this manner, reset of the main counter chain is withheld until a satisfactory phase lock is effected.

It is also desirable that the reset operation of the main counter chain be accurately referred back to the occurrence of the frame synchronizing pulse. This may be accomplished despite the aforesaid delay of application of the reset pulses to the counter chain by resetting the main counter chain to a count equal to the number of counts involved in the aforesaid delay.

Figure 2:
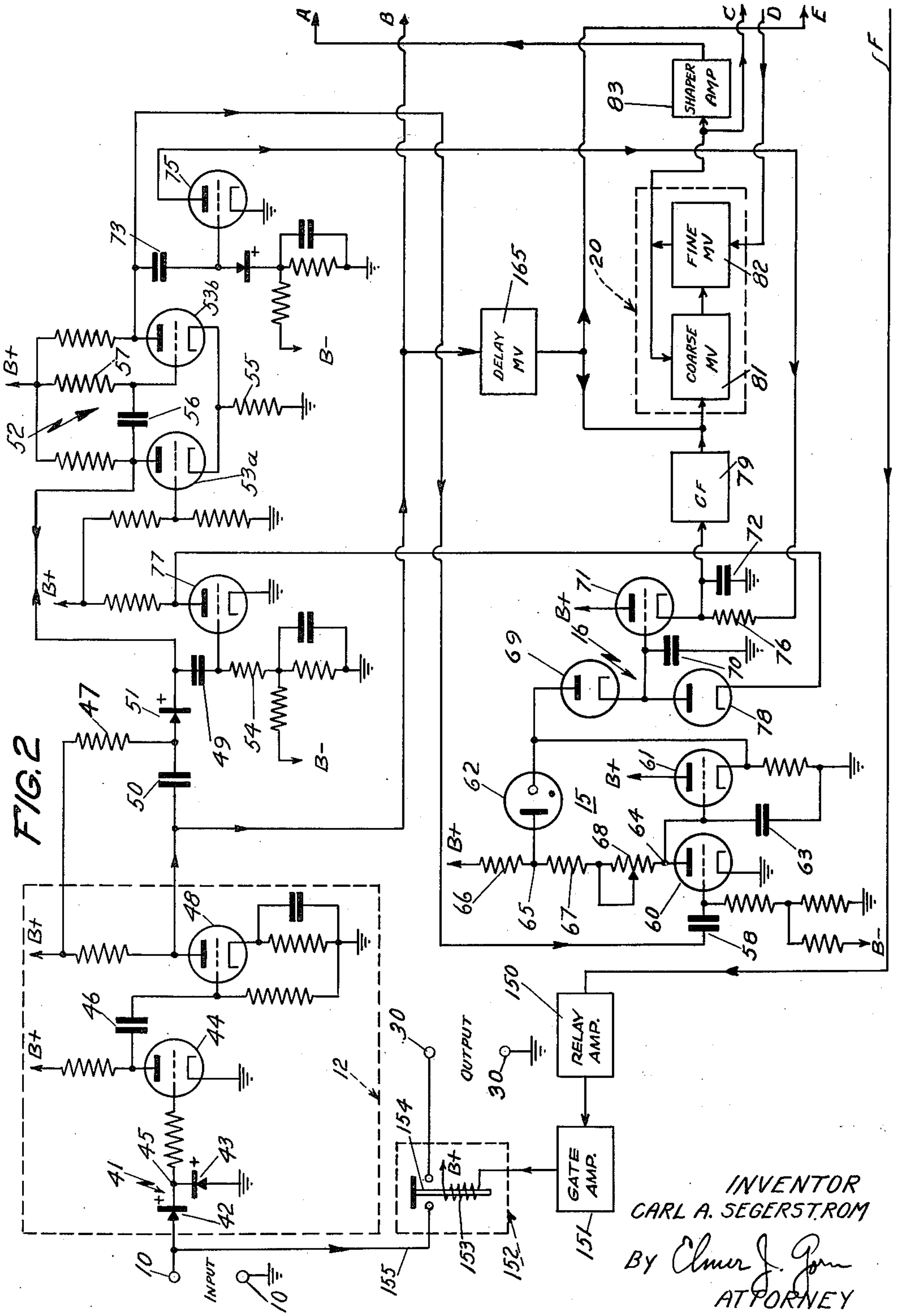
Figure 3:
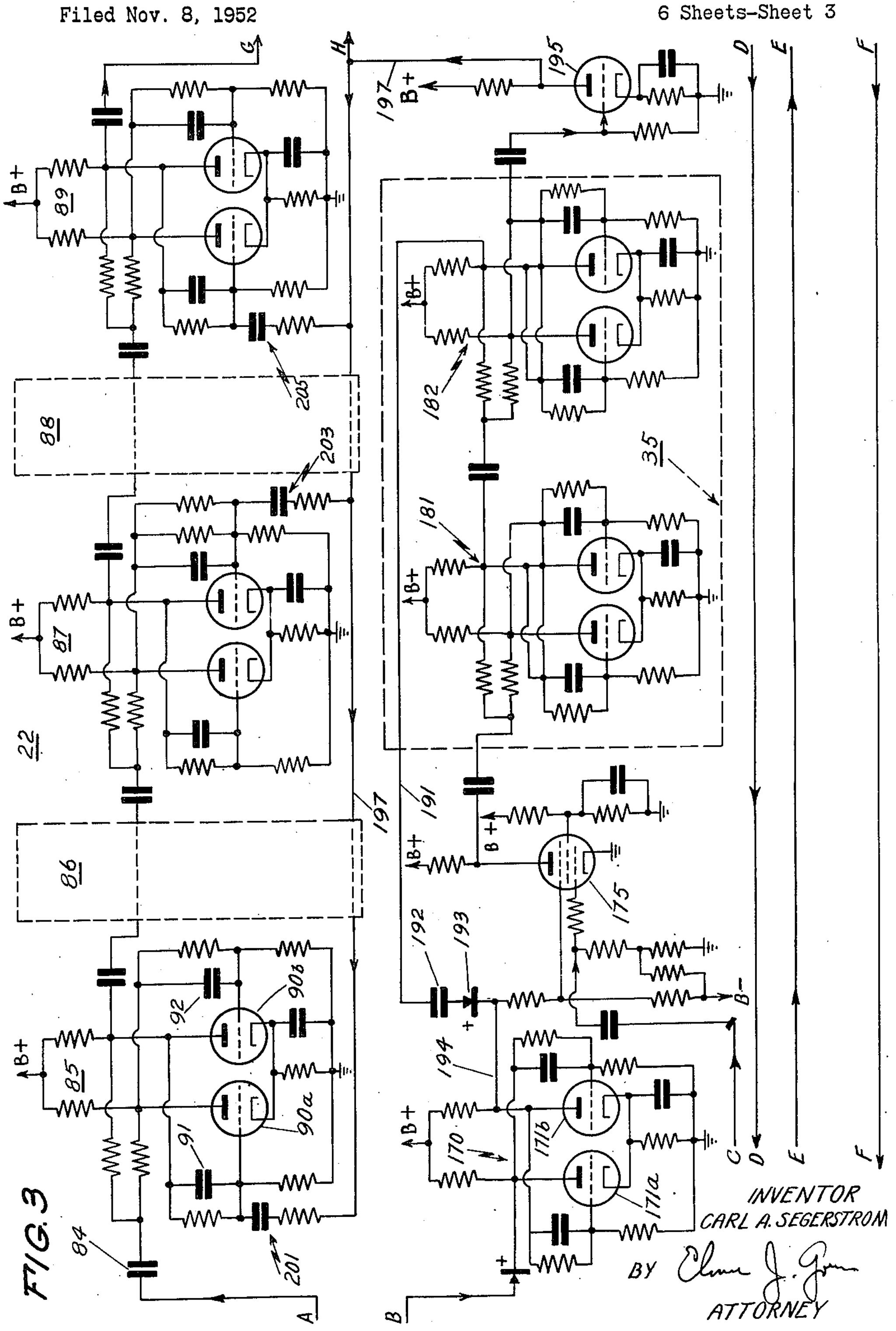
Figure 4:
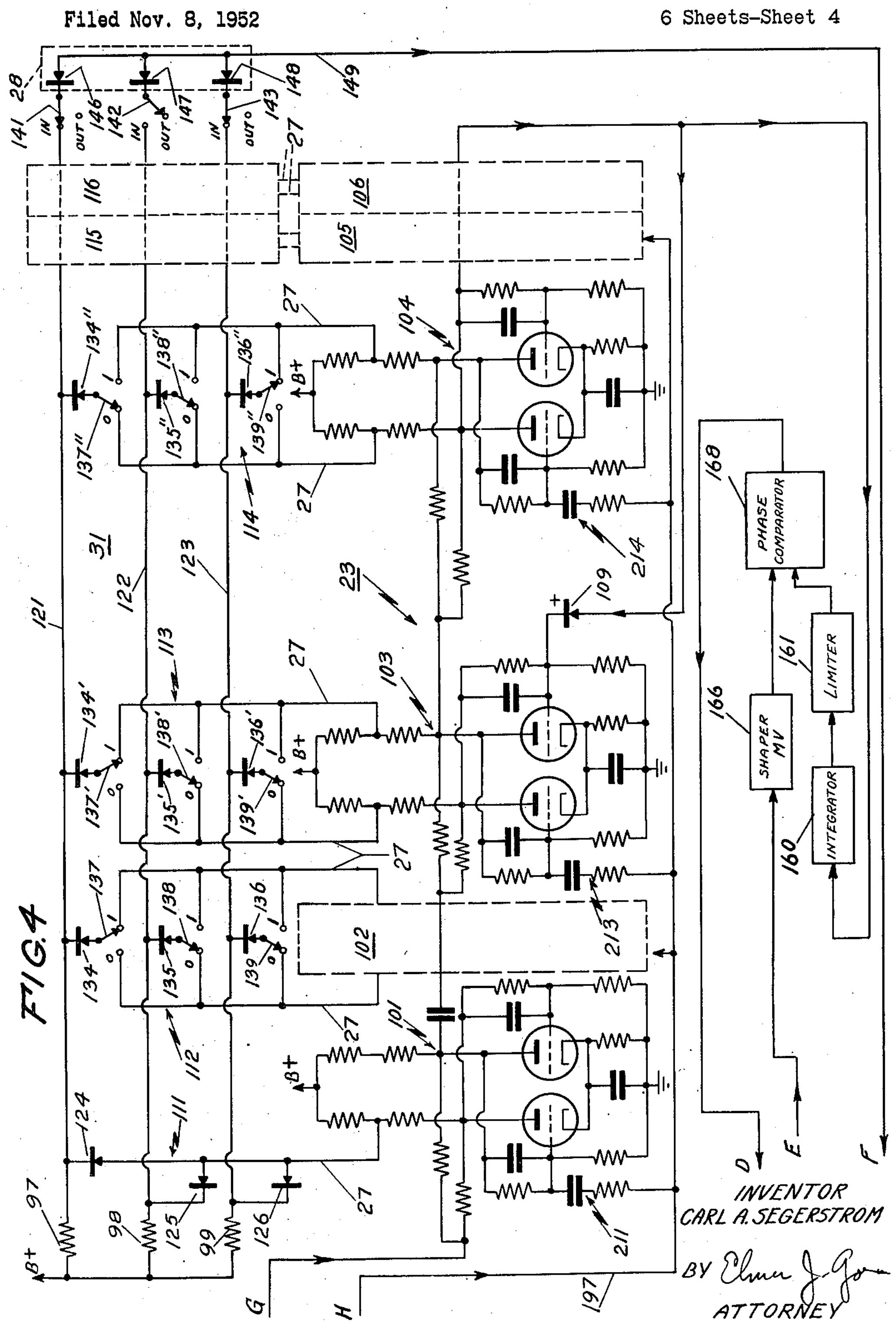
Figure 5:
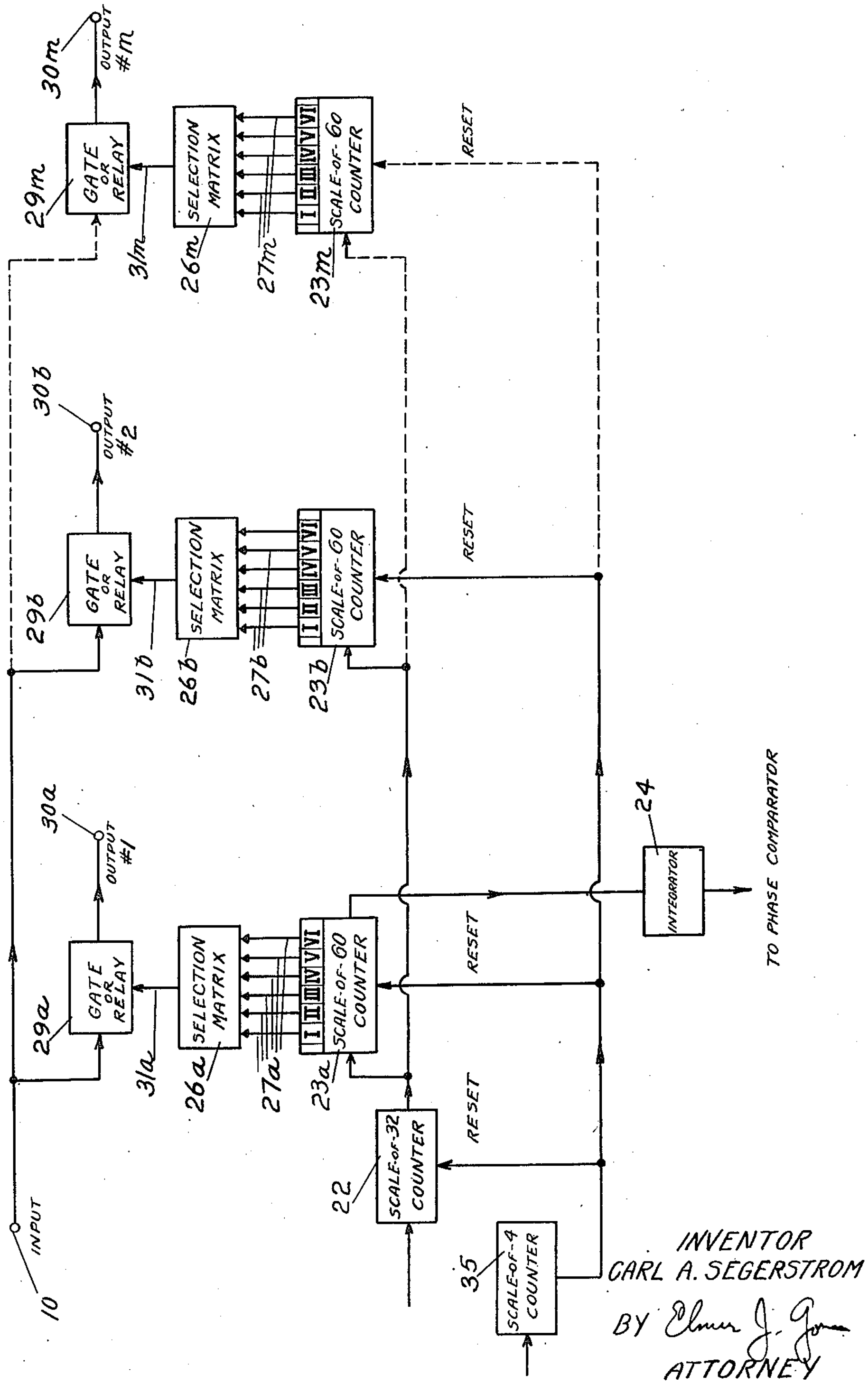
Figure 6:
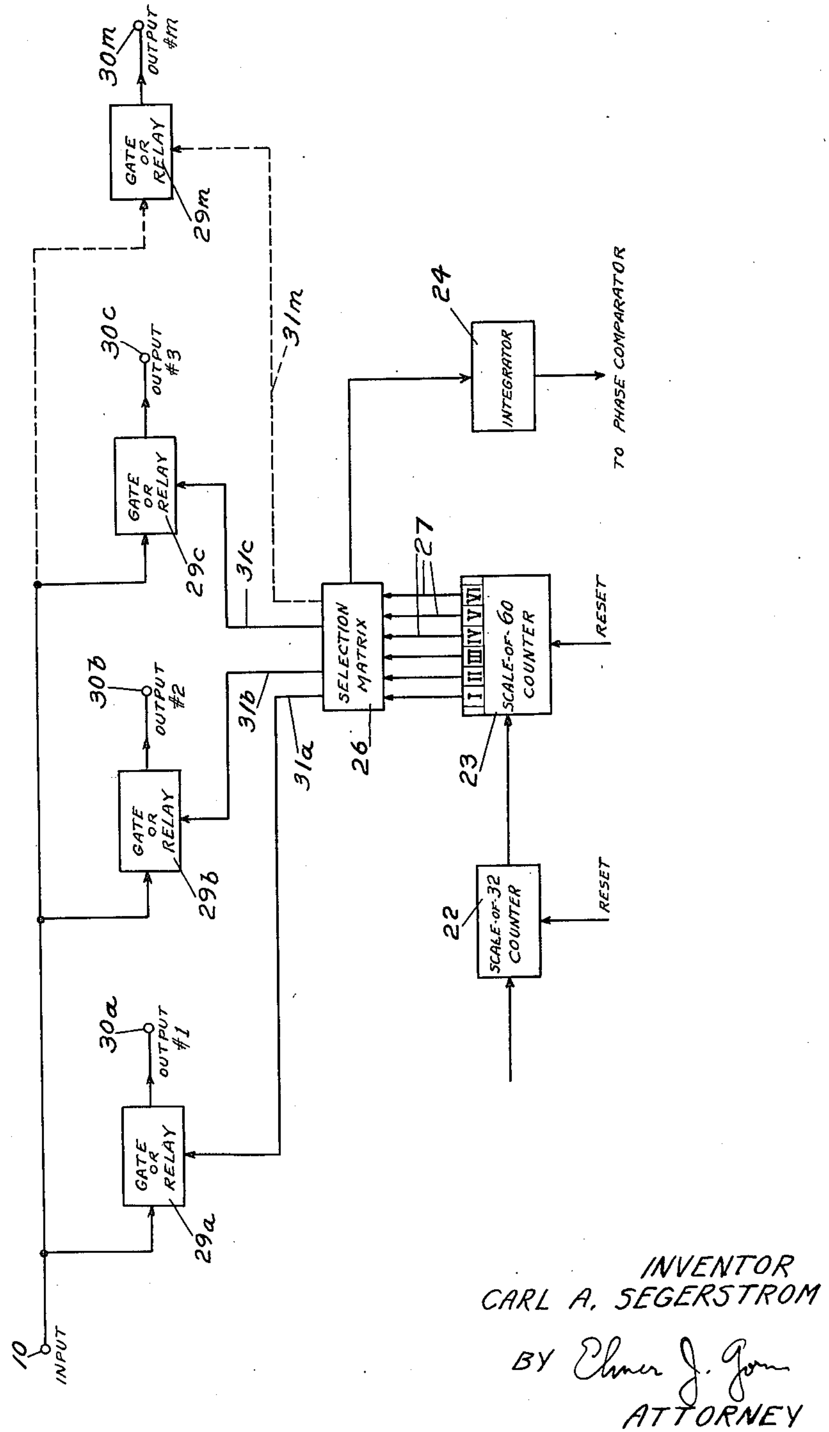

In the drawings:

Fig. 1 is a block diagram of a first embodiment of a commutated channel separator in accordance with the subject invention;

Figs. 2, 3 and 4 together constitute a composite circuit and block diagram of the embodiment of the invention shown in Fig. 1;

Fig. 5 is a fragmentary block diagram showing a second embodiment of the subject invention; and Fig. 6 is a fragmentary block diagram of a third embodiment of the subject invention.

Referring to Fig. 1, the input signal from the telemetering receiver applied to the input terminal 10 of the channel separator is introduced into a frequency control circuit 11 which comprises, essentially, a synchronizing separator and shaper circuit 12, a synchronizing period detector 14 and a phase comparator 18. The input signal is first applied to synchronizing separator circuit 12 which separates out the synchronizing pulses from the remaining channel pulses contained in the input signal and reshapes these pulses. The period of the synchronizing pulses is converted into a voltage in the synchronizing period detector 14 by means of a linear sawtooth sweep generator 15 and peak detector 16. This voltage is used as a coarse frequency control voltage for controlled oscillator 20, which may be a multivibrator or some form of reactance tube modulated oscillator, whose frequency is held to within about three percent of 1920 times the frame synchronizing frequency by means of the aforesaid coarse frequency control voltage derived from synchronizing period detector 14.

The synchronizing pulses derived from synchronizing separator and shaper 12 are delayed approximately fifty microseconds by delay-shaper circuit 17, which produces a positive pulse of about 150 microseconds duration. Where necessary, oscillator 20 is originally started by means of a pulse produced by delay-shaper circuit 17 corresponding to the frame synchronizing pulse.

The fine frequency control voltage which is applied to controlled oscillator 20 is obtained from a phase comparator circuit 18, to be described later.

The output pulses from controlled oscillator 20 are applied to the input of a counter chain 21, including a scale-of-32 counter 22, follower by a scale-of-60 counter 23. The counter chain 21 consists of a scale-of-32 counter 22 feeding into a scale-of-60 counter 23 so that the last stage of counter 23 changes state every $32\times60$ counts or every 1920 counts or cycles of the oscillator 20. When the controlled oscillator 20 is running at the correct synchronous frequency and counter 21 has been reset properly, as will be shown later, the change in state in the final stage of counter 23 coincides in time with the occurrence of the frame synchronizing pulse.

The output pulses from the last stage of counter 23 recur at a frequency which is very nearly equal to the frequency of the frame synchronizing pulses and occur very nearly in phase coincidence with these frame pulses.

The output pulse from counter 23 is integrated by integrator 24 in order to provide an output wave with a sloped leading edge. This integrated output wave and the positive pulse derived from delay-shaper circuit 17 are applied to phase comparator 18 which detects difference in phase between the output voltage from the last stage of counter 23 and the frame synchronizing pulse and delivers an appropriate correction voltage to controlled oscillator 20. The synchronizing pulses are delayed approximately fifty microseconds in circuit 17 so that a comparison between the synchronizing pulse and the integrated counter pulse may be made on the slope of the integrated pulse rather than at the knee of this pulse, thus improving the accuracy of phase comparator 18.

In addition, in the channel selection circuit 25, a selection matrix 26 responds at the time of the beginning of a designated information channel and remains in this condition for the channel duration when the controls of matrix 26 are adjusted for this designated channel.

Selection matrix 26 is tied in with all but the first stage of counter 23 by means of selector leads 27 and selects gate pulses from counter 23 corresponding to the desired channel segments. Selection in the matrix 26 is accomplished by means of a number of switches and by individual diode matrix elements (not shown in Fig. 1) to the output circuits of a like number of stages of counter 23.

Matrix 26 includes a plurality of identical matrix buses 31 equal in number to the maximum number of channels which are to be simultaneously selected. If, for example, only one channel is to be selected, at one time, only one matrix bus need be used. Matrix 26 may be considered as a coincidence circuit in that a given matrix bus will rise in voltage only when all of the diodes of the individual matrices are connected through corresponding selector leads 27 to counter stage output circuits whose potential is rising. Knowing the manner in which counter 23 cycles, it is possible by means of the aforesaid switches in matrix 26 to select a combination of counter stages whose output circuits rise in potential coincidentally with the desired channel segment. The gate pulses produced on one or more of the matrix buses 27 are combined in mixer 28 and are used to close a gate circuit 29 inserted between the input terminal 10 and output terminal 30 and thereby allow only the desired channels to reach the output terminal 30 of the equipment.

A phase control circuit 32 is adapted to correct the phase of the counter chain once during each frame (interval between synchronizing pulses). Direct application of a reset voltage to the various counters would result in correcting the phase between the frame synchronizing pulse and the output pulse from counter 23 despite the fact that the frequency of oscillator 20 was less than the recurrence rate of the synchronizing pulses, thus rendering the fine frequency control circuit ineffective. This condition is avoided by applying the reset to counters 22 and 23 only after the fine frequency control comparison has been accomplished.

The negative synchronizing pulse from synchronizing separator and shaper 12 triggers multivibrator 33 whose positive-going output opens reset gate 34 to which pulses from oscillator 20 are applied. The oscillator pulses then pass through gate 34 and trigger a two-stage scale-of-4 counter 35. The fourth pulse from oscillator 20 returns counter 35 to its original state and also applies a positive reset pulse to all stages of counters 22 and 23 of counter chain 21, thus returning the counters to a condition corresponding to the fourth oscillator period after the synchronizing pulse. Simultaneously multivibrator 33 is returned to its original condition by negative pulses from the second stage of counter 35 thus cutting off reset gate 34. The delay of four oscillator periods is always greater than the combination of the fifty-microsecond delay of the frame synchronizing pulse as applied to phase comparator circuit 18 and the maximum delay, if any, of the thirtieth channel gate with reference to the original frame synchronizing pulse, thereby insuring that phase comparison is accomplished before reset.

Referring to Figs. 2, 3 and 4, which are arranged in a line from left to right in the order named, the incoming signal at input terminals 10, 10 comprises channel data in the form of positive-going channel pulses and negative-going synchronizing signals. If, for example, the frame synchronizing frequency is four pulses per second and the number of channels including the synchronizing channel is 30, the interval between frame synchronizing pulses is 250 milliseconds and the duration of each channel will be 8.3 milliseconds. It should be understood that the values recited are merely illustrative, since any desired number of channels may be located between adjacent synchronizing pulses and the spacing between the various channel pulses may be varied, depending upon the configuration of the mechanical commutator used in conjunction with this system.

The synchronizing signals applied to synchronizing separator and shaper circuit 12 are separated from the channel data by synchronizing separator 41 consisting of two diodes 42 and 43 connected back-to-back and an amplifier tube 44. Only the negative-going synchronizing signals are theoretically capable of passing through diode 42 to the grid of amplifier 44; in the event that some positive-going signals do reach junction point 45, however, they are shunted to ground by way of diode 43. The negative synchronizing pulses thus separated out are amplified by amplifier 44 and coupled by way of capacitor 46 to an amplifier-shaper stage 48 whose output consists of negative synchronizing pulses with sharp leading edges. The synchronizing pulses from the plate of tube 48 are differentiated by resistor 47 and capacitor 50, and the negative portion or spike of the differentiated waveform passes crystal diode 51 to the plate of tube 53*a* of delay multivibrator 52 which is a basic cathode-coupled monostable multivibrator, such as described on pages 168 to 172 of "Waveforms" by Chance et al., published in 1949 by the McGraw-Hill Book Company, Inc., as volume 19 of the M. I. T. Radiation Laboratory Series. Crystal diode 51 limits the positive overshoot by virtue of its high back-to-front resistance to positive pulses. Briefly, the initial and stable state is with section 53*b* conducting and section 53*a* nonconducting. Stage 53*b* is conducting because its grid is tied to B+ through resistor 57, causing the grid of stage 53*b* to overcome cathode bias and pass sufficient plate current through its cathode resistor 55 to raise the cathode potential towards that of the grid so that stage 53*b* operates near zero bias. Stage 53*a* is nonconductive because of the negative bias resulting from plate current flowing from conducting stage 53*b* through common cathode resistor 55.

When the negative synchronizing pulses, coupled through capacitor 56, reach the grid of section 53*b*, they drive the grid negative, cutting off the stage, and abruptly interrupting the flow of plate current through cathode resistor 55. This removes the negative bias opposing the positive bias on the grid of stage 53*a* and permits conduction. The plate potential of stage 53*a* then drops and passes a negative pulse to the grid of stage 53*b*, which further holds it nonconducting. When stage 53*a* starts to conduct, its plate current also flows through cathode resistor 55 and again produces a negative drop in potential on the grid of stage 53*a*. However, since a self-biased tube cannot be cut off by itself, stage 53*a* will remain conductive until cut off by some other means. Stage 53*b*, however, will not remain indefinitely nonconductive because the potential at the grid of stage 53*b* will rise downward B+ as fast as the time constant of capacitor 56 and resistor 57 will permit. This will eventually raise the potential at the grid of stage 53*b*, causing the current through resistor 55 to increase, increasing the bias from grid to cathode of stage 53*a* beyond its cutoff. Hence, the monostable multivibrator 52 reverts to its original condition.

The positive pulses from the plate of stage 53*b*, which are of the order of two milliseconds, are applied by way of capacitor 58 to the input circuit of a bootstrap sawtooth generator 15 consisting of tubes 60, 61 and 62 and associated circuitry. A cathode follower 61 is used in conjunction with sawtooth generator tube 60 to obtain the desired linearity of the sawtooth voltage and the grid of tube 61 is directly coupled to the plate circuit of tube 60. The output of cathode follower 61 is coupled back to the plate circuit of tube 60 through neon tube 62.

The two millisecond positive gates whose leading edges correspond to the leading edges of the frame synchronizing pulses, and which arrive at the grid of tube 60, cause the potential at point 64 to drop abruptly, discharging capacitor 63. At the end of the positive gate, tube 60 is cut off to allow capacitor 63 to charge through resistors 68, 67 and 66 to B+.

When capacitor 63 of tube 60 begins to charge, the rise in potential of point 64 is fed to the grid of cathode follower 61. The increased plate current in tube 61 causes the cathode to rise substantially the same amount as the grid, provided the amplification of the cathode follower is close to one. Thus, the cathode of tube 61 feeds back to the junction point 65 between plate resistors 66 and 67, the same increase in potential that point 64 originally experiences. A constant potential difference is thus maintained across points 64 and 65 during the charging cycle with the result that a constant current is established in resistors 64 and 65. This constant current flowing from B+ through resistive elements 66 to 68, capacitor 63 and ground charges capacitor 63 at a constant rate so that the potential across this capacitor will rise linearly with time to produce the desired linear sawtooth voltage.

Potentiometer 68 is a sweep slope control potentiometer whose purpose is to vary the rate of charge of capacitor 63 to compensate for tube and circuit constants.

Each frame synchronizing pulse, therefore, triggers a linear sawtooth wave whose maximum level appears across capacitor 70 of a standard peak detector 16 including charging diode 69 and capacitor 70. The voltage appearing across detector capacitor 70 is a direct function of the period between adjacent synchronizing pulses. This voltage across capacitor 70 is transferred to capacitor 72 through transfer cathode follower 71 during the two millisecond periods immediately following the leading edge of each frame synchronizing pulse.

The operation of the transfer cathode follower is as follows. The positive two-millisecond pulses derived at the plate of section 53*b* of multivibrator 52 are also fed by way of capacitor 73 to a resistance triode 75, causing it to conduct. The negative output thus obtained from the plate of triode 75 is applied to the cathode of transfer cathode follower 71 through cathode resistor 76, thus changing the cathode return of cathode follower 71 from a virtual open circuit, corresponding to the nonconductive condition, to about 10,000 ohms. This is equivalent to a switch in the cathode return allowing cathode resistor 76 to be grounded through normally nonconductive tube 75 during the two-millisecond gate pulse from multivibrator 52. Prior to this switching action, all circuits across capacitor 72 are virtually open circuited so that no discharge may occur between the two-millisecond pulses. When switching occurs, the voltage across capacitor 70 is transferred substantially through cathode follower 71 to capacitor 72.

At the end of the two millisecond period, the positive pulse appearing at the plate of stage 53*a* is differentiated by the circuit comprising capacitor 49 and resistor 54 so that a substantial positive spike corresponding to the leading edge of the aforesaid positive pulse appears at the grid of tube 77, causing its plate potential to drop abruptly. The plate of tube 77 is tied to cathode of diode 78; thus discharge amplifier 77 discharges peak detector capacitor 70 through discharge diode 78 at the end of the two-millisecond interval.

Summarizing, the waveform from delay multivibrator 52 drives resistance triode 75 in the cathode circuit of cathode follower 71 which enables the normally-open cathode circuit to close so that cathode follower 71 may charge or discharge capacitor 72, depending on the change in charge across capacitor 70. If capacitor 70 is charged to a higher voltage than capacitor 72, then cathode follower 71 charges capacitor 72 to the level of capacitor 70. The discharge of capacitor 70 of the peak detector is effected by means of triode 77 and discharge diode 78 at the time the grid of tube 77 receives a positive pulse via capacitor 49 from the plate of tube 53*a* of multivibrator 52. The leading edge of the positive pulse corresponds to the trailing edge of the two-millisecond delay pulse.

The voltage on capacitor 72 is applied to cathode follower 79 whose output is a coarse frequency control voltage for controlled oscillator 20.

Controlled oscillator 20 is a dual cathode-coupled monostable multivibrator whose frequency is held near 1920 times the frequency of the frame synchronizing pulses. This oscillator consists of coarse multivibrator 81 and fine multivibrator 82 connected in a ring circuit to provide sustained oscillation. The grid bias voltages on the free grids of these multivibrators control their periods. The coarse frequency control voltage derived from cathode follower 79 is applied to the free grid of coarse multivibrator 81 and holds oscillator 20 to within about three percent of its proper frequency. The fine frequency control voltage, derived from the output of a phase comparator in a manner to be described subsequently, is applied to the free grid of fine multivibrator 82 of oscillator 20 and compensates for small errors in frequency. The details of the controlled oscillator are fully set forth in co-pending application, Ser. No. 318,439, to Forsberg, filed November 3, 1952, now U. S. Patent No. 2,735,939.

The output pulses from control oscillator 20 are amplified and shaped by stage 83 and applied via capacitor 84 to the input of a scale-of-32 counter 22 consisting of five cathode-coupled bistable multivibrators 85 to 89 which are ordinary scale-of-2 multivibrator circuits having two plate-to-grid couplings and a common bias arrangement between the two halves of the circuit whereby the stage as a whole remains in either one of its two stable states until the application of a negative input pulse to one of the tube grid circuits of each multivibrator. This base circuit is shown in Fig. 5.6 on page 166 of "Waveforms" by Chance et al., previously referred to. Although the basic operation of this circuit is well known, a brief description of its operation is presented below.

In the absence of any negative synchronizing pulses to the input of the scale-of-32 counter, the left-hand section of each stage is nonconductive and the right-hand section of each stage is conductive. If, for example, a negative synchronizing pulse is applied to the grids of both sections **90*a* and 90*b* of the first stage 85, this pulse will have no effect on the left-hand section 90*a* of stage 85 since it is already nonconductive. The application of a negative pulse to the grid of the right-hand section 90*b* of stage 85 will, however, cut off this section, making its plate become more positive and, through capacitor 91, the grid of the left-hand section 90*a* swings positive. If this left-hand section begins to conduct, its plate swings negatively and the negative pulse coupled to the grid of section 90b through capacitor 92 causes this right-hand section 90*b*** to cut off. Each successive negative synchronizing input pulse will reverse the operating state of the initial stage. The positive pulses will not effect the condition of the succeeding stage of the counter since the constants of the multivibrator circuitry and the values of the operating voltages are selected so that positive pulses of amplitude equal to that of the negative pulses will not overcome the bias then existing on the nonconductive section of the stage.

The output of the right-hand section **90*b* of initial counter stage 85 of the scale-of-32 counter 22 is coupled to the grids of second stage 86, which is identical with the first stage. Initially, the right-hand section of second stage 86 is the conductive section so that the second stage can be triggered into its opposite state only when the right-hand section of the first stage is nonconductive. In other words, when positive pulses appear at the plate of the right-hand section of a given stage, the succeeding stage is unaffected, whereas negative-going pulses appearing at the plate of the right-hand section of a given stage, corresponding to the condition of the change of state from nonconduction to conduction, are capable of triggering the following stage. The third counter stage 87** differs from the remaining stages only in the arrangement of its reset circuit which will be described later.

For every thirty-two pulses from controlled oscillator 20 appearing at the input of the scale-of-32 counter, a single negative pulse is derived at the output of the last counter stage. In other words, during each frame synchronizing period approximately sixty pulses from oscillator 20 are derived from output stage 89, provided, of course, that the frequency of oscillator 20 is probably controlled by the fine frequency control circuit to be described later.

The output of the scale-of-32 counter 22 drives a scale-of-60 counter 23 comprising a series of six bistable multivibrators 101 to 106, inclusive, which are conventional binary counters differing from those of the preceding scale-of-32 counter 22 only in choice of circuit constants. A feedback loop from the output of the sixth stage 106 of the scale-of-60 counter 23 through diode 109 to the third stage 103 thereof serves to convert what would normally be a scale-of-64 counter into the desired scale-of-60 counter.

The four to eight C. P. S. output on the plate of the last stage 106 of scale-of-60 counter 23 is integrated by a basic RC integrator network 160 and limited by limiter 161. The leading edge of the resultant wave has a slope which is substantially linear, rising by about ten volts in approximately 200 microseconds. This integration is necessary in order to provide a sloping leading edge for the wave derived from the counter before application to the pulse phase comparator circuit, to be described later.

The negative-going leading edge of the frame synchronizing pulses from the output of synchronizing separator and shaper 12 is delayed approximately fifty microseconds by delay multivibrator 165 and shaped into a 150-microsecond pulse by the succeeding multivibrator 166. The integrated and limited output from counter 23 and the delayed pulse from the synchronizing separator and shaper 12 are applied to the input of the pulse phase comparator network 168 which may be any type of pulse phase comparison circuit well known in the art. A phase comparator suitable for use in the subject invention is shown and described in application by Dunham, Serial No. 315,148, filed October 16, 1952.

The output voltage derived from phase comparator 168 is applied to the grid of fine multivibrator 82. This voltage thus serves as a fine frequency control voltage for control oscillator 20, thereby maintaining the frequency of oscillator 20 at a value which is always substantially a fixed multiple—in this case 1920—of the frequency of the synchronizing pulses.

The output pulses from the last stage 106 of the scale-of-60 counter 23 recur at a frequency $\frac{1}{1920}$ times the frequency of the control oscillator, and, since the latter is maintained in synchronism with 1920 times the synchronizing frequency by means of the fine frequency control circuit previously described, the output pulses from stage 106 recur at nearly the same rate as the synchronizing pulses. In the particular application described, there are thirty channels, including the synchronizing pulse, contained in the commutated main channel input to the channel selector. Each channel including the synchronizing pulse then occupies $\frac{1}{30}$ of the total period between adjacent synchronizing pulses, and the interval between successive channels corresponds to 64 periods of oscillation of oscillator 20. The channel separator according to the invention may operate with any number of channels subject only to obvious redesign of the number of counter stages and the selection matrix associated with the counters.

The scale-of-32 counter is so arranged that the various stages thereof resume their original electronic state or condition after thirty-two pulses have been received from oscillator 20. Since this counter is effectively reset to zero at the beginning of each synchronizing pulse, the states of the counter stages at the beginning of each channel pulse (every sixty-four input pulses from oscillator 20) are identical. Thus, at the beginning of each channel pulse, the left-hand sections of all stages of the scale-of-32 counter 22 are nonconductive, and the right-hand section of all stages are conductive.

Table I below illustrates the condition of counter 22 for the first three channels.

*Table I*

| Input Impulse from Oscillator | Channel No. | Scale-of-32 Counter Stages | | | | | | | | | |
|---|---|---|---|---|---|---|---|---|---|---|---|
| | | 85 | | 86 | | 87 | | 88 | | 89 | |
| | | L | R | L | R | L | R | L | R | L | R |
| 4* | | 0 | X | 0 | X | 0 | X | 0 | X | 0 | X |
| 32 | | 0 | X | 0 | X | 0 | X | 0 | X | 0 | X |
| 64 | 1 | 0 | X | 0 | X | 0 | X | 0 | X | 0 | X |
| 92 | | 0 | X | 0 | X | 0 | X | 0 | X | 0 | X |
| 128 | 2 | 0 | X | 0 | X | 0 | X | 0 | X | 0 | X |
| 156 | | 0 | X | 0 | X | 0 | X | 0 | X | 0 | X |
| 198 | 3 | 0 | X | 0 | X | 0 | X | 0 | X | 0 | X |

X=Conductive.
0=Nonconductive.
*Counter is reset to count-of-4 at beginning of each synchronizing pulse since the application of the reset voltage is delayed by four counts after the occurrence of the synchronizing pulse.

At the instant of reset, the left-hand sections of the six stages of scale-of-60 counter 23 are nonconductive and right-hand sections conductive. Since the initial stage 101 of the scale-of-60 counter is a binary counter, it will reverse its state for every negative pulse fed to it from the final stage 89 of the scale-of-32 counter, that is, for every 32 impulses from oscillator 20. This is shown in Table II.

*Table II*

| Input Impulse | Channel | Scale-of-32 Counter Final Stage 89 | | Scale-of-60 Counter Initial Stage 101 | |
|---|---|---|---|---|---|
| | | L | R | L | R |
| 0 or 1920 | | 0 | X | 0 | X |
| 32* | | 0 | X | X | 0 |
| 64 | 1 | 0 | X | 0 | X |
| 92 | | 0 | X | X | 0 |
| 128 | 2 | 0 | X | 0 | X |
| 156 | | 0 | X | X | 0 |
| 198 | 3 | 0 | X | 0 | X |

X=Conductive.
0=Nonconductive.
*28 counts after reset by scale-of-4 counter (to be described later).

Similarly, the state of the second stage 102 of the scale-of-60 counter will be reversed for every two pulses fed to it from the first stage 101, that is, for exery sixty-four impulses from oscillator 20, and so forth. The condition or state of the six stages 101 to 106 of the scale-of-60 counter for the first six channels is shown in Table III below.

*Table III*

| Input Impulse from Oscillator | Channel | Scale-of-60 Counter Stages | | | | | | | | | | | |
|---|---|---|---|---|---|---|---|---|---|---|---|---|---|
| | | 101 | | 102 | | 103 | | 104 | | 105 | | 106 | |
| | | L | R | L | R | L | R | L | R | L | R | L | R |
| 0 or 1920 | | 0 | X | 0 | X | 0 | X | 0 | X | 0 | X | 0 | X |
| 32 | | X | 0 | 0 | X | 0 | X | 0 | X | 0 | X | 0 | X |
| 64 | 1 | 0 | X | X | 0 | 0 | X | 0 | X | 0 | X | 0 | X |
| 96 | | X | 0 | X | 0 | 0 | X | 0 | X | 0 | X | 0 | X |
| 128 | 2 | 0 | X | 0 | X | X | 0 | 0 | X | 0 | X | 0 | X |
| 160 | | X | 0 | 0 | X | X | 0 | 0 | X | 0 | X | 0 | X |
| 192 | 3 | 0 | X | X | 0 | X | 0 | 0 | X | 0 | X | 0 | X |
| 224 | | X | 0 | X | 0 | X | 0 | 0 | X | 0 | X | 0 | X |
| 256 | 4 | 0 | X | 0 | X | 0 | X | X | 0 | 0 | X | 0 | X |
| 288 | | X | 0 | 0 | X | 0 | X | X | 0 | 0 | X | 0 | X |
| 320 | 5 | 0 | X | X | 0 | 0 | X | X | 0 | 0 | X | 0 | X |
| 352 | | X | 0 | X | 0 | 0 | X | X | 0 | 0 | X | 0 | X |
| 384 | 6 | 0 | X | 0 | X | X | 0 | X | 0 | 0 | X | 0 | X |

X=Conductive.
0=Nonconductive.

The plate circuits of the various stages of the scale-of-60 counter are connected to a series of corresponding crystal matrices 111 to 116, inclusive, by way of matrix selector leads 31. The plate of the left-hand section of stage 101 is permanently connected to a series of matrix buses 121, 122 and 123 through diodes 124, 125 and 126, respectively.

Matrix buses 121, 122 and 123 are connected to B+ through resistors 97, 98 and 99, respectively. The output or plate circuits of either one section or the other of the remaining stages 102 to 106 may be connected to the matrix buses through corresponding diodes 134, 135, 136, and so forth, by means of toggle switches 137, 138 and 139, and so forth, respectively, whenever said switches are either in position 0 or 1. When a given switch is thrown to position 0, only the plate circuit of the left-hand section of a given stage is tied to the matrix bus corresponding to that switch, while, if the switch is at position 1, the right-hand section only of a given stage is tied to the matrix bus corresponding to that switch.

The number of matrix buses used depends upon the total number of channels which it is desired to select simultaneously; thus, in the example shown in Fig. 4, any combination of three channels may be selected.

Switches 141, 142 and 143 are closed (placed in the "in" position) whenever it is desired to transmit the channel corresponding to the switch so closed. For example, if transmission of three different channels simultaneously is desired, switches 141, 142 and 143 will all be closed, whereas, if transmission of only one channel is desired at a given time, only one of these switches need be closed, and so forth.

Each of the matrix buses 121 to 123 is connected through switches 141 to 143 and a mixer 28 consisting of diodes 146 to 148, respectively, to lead 149 which connects the selected channel pulse or pulses to a gate amplifier 150 having an even number of stages from which large amplitude positive gate pulses are obtained. These gate pulses are used to drive relay amplifier 151 in whose plate circuit is connected a high-speed relay 152. Relay amplifier 151 is normally nonconductive and coil 153 of relay 152 is therefore de-energized. During the time of application of the positive gate pulses to relay amplifier 151, this amplifier is rendered conductive and relay coil 153 becomes energized. Armature 154 of relay 152 is then actuated so as to close the relay contacts. In this way those input pulses appearing on lead 155 which correspond in time with the closure of relay 152 are allowed to pass to the output terminals 30, 30.

Although an electronic gate may be used in lieu of an electromechanical relay, the latter has the advantages of no contact potential and no resistance variations because of aging and supply voltage variations.

Returning now to the counter-matrix circuit, when the letf-hand section of stage 101 of counter 23 is conductive, the potential at the plate of the left-hand section will fall and the cathodes of diodes 124 to 126 will become sufficiently negative to allow these diodes to conduct, drawing current through their respective load resistors 97, 98 and 99 and the left-hand section of stage 101. This current flow through the conductive diodes will pull down the potential of the bus associated with the diode so conducting. In this case, the diodes 146 to 148 are nonconductive and no pulses are derived from the output of mixer 28.

When the left-hand of stage 101 is nonconductive, the potential at the plate of this section is sufficiently high to prevent conduction in diodes 124 to 126 and the potential of the matrix buses will rise sufficiently to allow diodes 146 to 148 to conduct. In this connection, it should be noted that the effect of the remaining stages 102 to 106 of the counter and their corresponding matrices have not yet been considered. It is obvious at this point, however, that the left-hand section of the first counter stage 101 must be nonconductive and the right-hand section conductive in order to derive positive gate pulses capable of allowing transmission of information to the channel selector output terminals.

By means of switches 137, 138 and 139, it is possible to selectively connect the output of either the left-hand section or the right-hand section of the second stage 102 of counter 23 to the cathodes of the respective diodes 134, 135 and 136. When the toggle switch 137 is in position 1, the right-hand section of stage 102 is connected via the corresponding selector leads to the cathode of diode 134 while the left-hand section is disconnected entirely from said diode. The anode of diode 134 is connected to the matrix bus 121.

When the right-hand section of stage 102 is conductive, the potential on the cathode of diode 134 is reduced so that diode 134 becomes conductive and the potential on matrix bus 121 decreases. Regardless of the condition of the other control stages, the conduction in diode 134 alone is sufficient to cut off diode 146 in mixer 28 and effectively open up matrix bus 121. Although the left-hand section of stage 102 is simultaneously nonconductive, this section is ineffective since there is no connection made to matrix bus 121 through switch 137.

If switch 137 is moved to position 0, assuming that the right-hand section of stage 102 is still conductive and the left-hand section nonconductive, the connection of the plate circuit of the right-hand section to diode 134 is broken and an electrically-conductive path now established between the plate circuit of the left-hand section of stage 102 and the cathode of diode 134. Since, however, the left-hand section is nonconductive, diode 134 will be cut off and there will be no drop of potential across resistor 97 to pull down the potential on bush 121.

Switches 138 and 139 similarly serve to connect either one section or the other of stage 102 through diodes 135 and 136, respectively, to matrix buses 122 and 123, respectively.

The succeeding stages 103 to 106 of the scale-of-60 counter are connected to the matrix elements 113 to 116, respectively, which operate in the same manner as the matrix element of stage 102.

In order for a given matrix bus to rise in potential high enough to permit conduction of its mixer diode and, therefore, at a potential sufficient to produce a gate pulse for closure of the gate circuit interposed between the input and output terminals of the device, each and every one of the five crystals or matrix elements 112 to 116 associated with a given bus must be connected to a point which rises in voltage. In other words, every one of the nonconductive sections of the various stages of the scale-of-60 counter must be connected to the switches corresponding to a given matrix bus.

The sections which are instantaneously nonconductive depend upon the number of trigger pulses applied to the counter after reset. Knowing how the counter cycles (see Table III) it is possible to set up the five switches 137, 137′, 137″, and so forth, or 138, 138′, and so forth, or 139, 139′, and so forth, to select a combination of five plate circuits which rise in potential coincident with any desired channel pulse. For example, suppose it is desired to select the fifth channel. A glance at Table III will indicate that the left-hand sections of the second and fourth stages 102 and 104 of the scale-of-60 counter are conductive and the right-hand sections nonconductive. The state for the third, fifth and sixth stages is the reverse of the second and fourth stages; that is, their left-hand sections are nonconductive. In order to tie all nonconductive sections of the five stages 102 to 106 to diodes 134, 134′, 134″, and so forth, it is necessary to set up switches 137, 137′, 137″, and so forth, to the positions 1, 0, 1, 0, 0, respectively. With the switches thus set up, matrix bus 121 will rise in potential sufficiently to permit mixer diode 146 to conduct and a positive gate pulse will be derived from mixer 28. This positive pulse, after amplification in gate amplifier 151, will close the relay gate and allow the fifth channel pulse to pass through leads to the output terminals 30, 30 of the device.

It is obvious that, instead of using matrix bus 121, matrix 122 could have been raised in potential to allow conduction in diode 147 and permit a positive gate pulse corresponding to the fifth channel in time to be derived at the output of mixer 28. Likewise, bus 123 could have been used instead of buses 121 or 122.

From an inspection of Table III it is now evident that two channels, such as the third channel and fifth channels, could be simultaneously transmitted by leaving switches 137, 137′, and so forth, in the position just mentioned and by setting up switches 138, 138′, and so forth, to the positions 1, 1, 0, 0, 0, respectively. Positive pulses spaced in time by two channel widths would then be derived at the output of both diodes 146 and 147 of mixer 28 for application to the relay gate. The third and fifth channels could be simultaneously selected by utilization of buses 121 and 123 or buses 122 and 123 instead of buses 121 and 122.

The number of channels that may be transmitted simultaneously, as previously stated, is limited only by the independent buses, such as 121, 122 or 123, with the associated set of switches, diodes and selector leads composing a matrix.

The negative synchronizing pulses from synchronizing shaper tube 48 are applied to a synchronizing delay switch in the form of a bistable multivibrator 170 which is identical with the multivibrator used in the scale-of-32 counter already described, except that the input is connected only to the grid of the right-hand section. When negative synchronizing pulses arrive on the grid of the right-hand section 171*a* of multivibrator 170, this section is cut off and the plate potential rises. The positive pulses derived at the plate circuit of multivibrator 170 and the pulses from control oscillator 20 are applied to the number three and number one grids, respectively, of reset delay gate 175. During the presence of synchronizing pulses, the resulting positive pulses from multivibrator 170 applied to the number three grid of gate tube 175 open the gate and allow pulses from controlled oscillator 20 to pass through gate tube 175 to the grids of the first stage 181 of a scale-of-4 counter 35 consisting of stages 181 and 182. The amplified and inverted pulses from the controlled oscillator passing through gate 175 trigger counter 35. The fourth pulse from oscillator 20 returns counter 35 to its original condition and simultaneously returns multivibrator 170 to its original condition by virtue of the feedback path including lead 191, capacitor 192, diode 193 and lead 194 between the plate of the final stage 182 of counter 35 and the plate of the right-hand stage 171*b* of multivibrator 170. This negative fourth pulse thus applied to the grid of the left-hand section of the multivibrator stage 170 reverses the state of the multivibrator, causing 171*b* to conduct and lowering its plate voltage. This, in turn, causes the third grid of tube 175 to cut off the plate current of tube 175, so that there are no longer any trigger pulses available at the input of counter 35.

The output of this scale-of-4 counter 35, corresponding to the fourth pulse from oscillator 20, applies a positive pulse to the grid of reset amplifier 195. The output of amplifier 195 consists of a negative reset pulse which is delayed from the negative synchronizing pulse by four oscillator periods.

The delay of four oscillator periods is greater than the combined delay of the fifty-microsecond delay of the frame synchronizing pulse as applied to the phase comparator and the maximum delay, if any, of the thirtieth channel gate with reference to the original frame synchronizing pulse, thus insuring that the phase comparison previously referred to is made before the counters are reset. This reset pulse is applied over reset bus 197 to selected grids of all stages of both the scale-of-32 counter 22 and the scale-of-60 counter 23 to return these counters to a condition corresponding to the fourth count after the synchronizing pulse.

It will be noted in Fig. 3 in connection with the scale-of-32 counter 22 that resistive-capacitor reset coupling networks 201 and 205, as well as those incorporated in stages 86 and 88 (not shown in detail) interconnecting reset bus 197 and stages 85, 86, 88 and 89 of the scale-of-32 counter, are connected to the left-hand sections of these stages while the coupling network 203 is connected to the right-hand section of stage 87. This connection of reset coupling network 203 to the right-hand section of the third stage of the scale-of-32 counter is made so that the counter will set up to a count of four instead of to a count of zero.

It should be noted that the scale of the auxiliary counter 35 need not be 4, so long as the delay produced is sufficient to insure that a satisfactory phase lock has been attained. The scale may be made any number as long as the complete counter chain is reset to a count equal to that number.

The reset coupling networks 211, 213, 214, and so forth, of stages 101 to 106 of scale-of-60 counter 23 are all connected to the left-hand section of these stages. The entire counter chain 21, including the scale-of-32 counter 22 and the scale-of-60 counter 23, thus acts as though it has been reset to a count of zero for each frame synchronizing pulse.

This delay of the reset operation of counter 35 allows the waveform of the last stage 106 of the channel counter chain 21 to be compared with the corresponding frame synchronizing pulse and still gain the advantage of having the reset operation accurately referred back to the occurence of the synchronizing pulse. In other words, when the frame synchronizing pulse occurs, instead of resetting the complete counter chain (comprising the scale-of-32 counter and the scale-of-60 counter) directly, the scale-of-4 counter 35, which has previously been reset, starts to count at the same rate as the control oscillator frequency and, when counter 35 reaches a count of four, it transfers this count to the scale-of-32 counter 22 by setting up this count-of-4 in the reset operation.

In Fig. 5, a modification of the channel separator described in Figs. 1 to 4 is shown in which elements corresponding to those of Figs. 1 to 4 are indicated by like reference numerals. In the modification shown in Fig. 5, as well as that shown in Fig. 6, to be described later, the gate pulses produced on the matrix bus corresponding to the desired channels, instead of being combined or mixed before application to a single electronic or electromechanical gate, are applied to individual gates to which corresponding separate output terminals are connected. The output of scale-of-32 counter 22 is applied to a plurality of scale-of-60 counters 23*a*, 23*b* . . . 23*m*, each of which is identical with counter 23 of Figs. 1 to 4. The output pulses from the last stage of any one of the scale-of-60 counters—in this case counter 23*a*—is connected to integrator 24, as in the case of the separator of Figs. 1 to 4.

Each of the six stages of the various scale-of-60 counters is applied to corresponding selection matrices 26*a*, 26*b* . . . 26*m* by way of matrix selector leads 27*a*, 27*b* . . . 27*m*.

The circuitry as well as the operation of the selection matrices are identical to that of the selection matrices described in Figs. 1 to 4 except for the fact that only a single matrix bus 31*a*, 31*b* . . . 31*m* is associated with each selection matrix and a separate gate circuit 29*a*, 29*b* . . . 29*m* and separate output terminals 30*a*, 30*b* . . . 30*m* are provided for each counter-matrix circuit so that only one information channel appears at each output terminal.

As in the embodiment shown in Figs. 1 to 4, the number of matrix buses used depends upon the total number of channels which it is desired to select simultaneously.

In Fig. 6, a further modification of the channel separator described in Figs. 1 to 4 is shown. This modification is simpler and more economical than that shown in Fig. 5, inasmuch as only one scale-of-60 counter is required for *m* channels to be selected simultaneously instead of *m* counters. Each separate matrix bus 31*a*, 31*b* . . . 31*m* of the counter-matrix circuit is connected to one of the corresponding gates 29*a*, 29*b* . . . 29*m* interposed between input terminals 10 and the respective output terminals 30*a*, 30*b* . . . 30*m*.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An electronic commutated channel separator having input and output terminals and adapted to selectively transmit therebetween a desired channel of communication in the form of pulses from recurring multiple channel trains of signal pulses, each of said trains of pulses including a synchronizing pulse followed by a pluarity of channel pulses, comprising means responsive to said synchronizing pulses for producing a first control voltage which is a direct function of the period between successive synchronizing pulses, means for generating oscillatory energy, a counter chain comprising a plurality of counters and receptive of said oscillatory energy for producing output pulses which have substantially the same recurrence frequency as said synchronizing pulses, a phase comparator energized by said synchronizing pulses and said output pulses for deriving a second control voltage whose amplitude is representative of the difference in phase between said output pulses and said synchronizing pulses, said generator being maintained in frequency at a multiple of said synchronizing period in response to said first and second control voltages, selection means adapted to be selectively connected to the output circuits of a portion of said counters in accordance with the channel desired, said selection means being productive of an impulse corresponding in phase and duration to said desired channel, a gate circuit interposed between said input and output terminals and responsive to said impulse for effecting transmission of said desired channel between said input and output terminals.

2. An electronic commutated channel separator having input and output terminals and adapted to selectively and simultaneously transmit therebetween desired channels of communication in the form of pulses from recurring multiple channel trains of signal pulses, each of said trains of pulses including a synchronizing pulse followed by a plurality of channel pulses, comprising means responsive t said synchronizing pulses for producing a first control voltage which is a direct function of the period between successive synchronizing pulses, means for generating oscillatory energy, a counter chain comprising a plurality of counters and receptive of said oscillatory energy for producing output pulses which have substantially the same recurrence frequency as said synchronizing pulses, a phase comparator energized by said synchronizing pulses and said output pulses for deriving a second control voltage whose amplitude is representative of the difference in phase between said output pulses and said synchronizing pulses, said generator being maintained in frequency at a multiple of said synchronizing period in response to said first and second control voltages, selection means adapted to be selectively connected to the output circuits of a portion of said counters in accordance with the channels desired, said selection means being productive of an impulse corresponding in phase and duration to said desired channels, mixer means for combining said impulses corresponding to said desired channels, a gate circuit interposed between said input and output terminals and responsive to the output of said mixer means for effecting transmission of said desired channels between said input and output terminals.

3. An electronic commutated channel separator having input terminals and a plurality of pairs of output terminals and adapted to selectively transmit therebetween desired channels of communication in the form of pulses from recurring multiple channel trains of signal pulses, each of said trains of pulses including a synchronizing pulse followed by a plurality of channel pulses, comprising means responsive to said synchronizing pulses for producing a first control voltage which is a direct function of the period between successive synchronizing pulses, means for generating oscillatory energy, a plurality of counter chains each comprising a plurality of counters, said counter chains being receptive of said oscillatory energy, one of said counter chains being adapted to produce output pulses which have substantially the same recurrence frequency as said synchronizing pulses, a phase comparator energized by said synchronizing pulses and said output pulses from said one of said counter chains for deriving a second control voltage whose amplitude is representative of the difference in phase between said output pulses and said synchronizing pulses, said generator being maintained in frequency at a multiple of said synchronizing period in response to said first and second control voltages, a plurality of selection means adapted to be selectively connected to the output circuits of a portion of said counters of said corresponding counter chains in accordance with the channels desired, each of said selection means being productive of an impulse corresponding in phase and duration to a desired channel, a plurality of gate circuits interposed between said input terminals and corresponding pairs of output terminals and responsive to said corresponding impulse for effecting transmission of said desired channels between said input terminals and said corresponding pairs of output terminals.

4. An electronic commutated channel separator having input terminals and a plurality of pairs of output terminals and adapted to selectively transmit therebetween desired channels of communication in the form of pulses from recurring multiple channel trains of signal pulses, each of said trains of pulses including a synchronizing pulse followed by a plurality of channel pulses, comprising means responsive to said synchronizing pulses for producing a first control voltage which is a direct function of the period between successive synchronizing pulses, means for generating oscillatory energy, a counter chain comprising a plurality of counters and receptive of said oscillatory energy for producing output pulses which have substantially the same recurrence frequency as said synchronizing pulses, a phase comparator energized by said synchronizing pulses and said output pulses for deriving a second control voltage whose amplitude is representative of the difference in phase between said output pulses and said synchronizing pulses, said generator being maintained in frequency at a multiple of said synchronizing period in response to said first and second control voltages, selection means adapted to be selectively connected to the output circuits of a portion of said counters of said counter chain in accordance with the channels desired, said selection means being productive of impulses corresponding in phase and duration to said desired channels, and a plurality of gate circuits interposed between said input terminals and corresponding pairs of output terminals and responsive to a corresponding impulse foı effecting transmission of said desired channels between said input terminals and said corresponding pairs of output terminals.

5. An electronic commutated channel separator having input and output terminals and adapted to selectively transmit therebetween a desired channel of communication in the form of pulses from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a course frequency control voltage which is a direct function of the period between successive synchronizing pulses, means for generating oscillatory energy, a counter chain comprising a plurality of counters and receptive of said oscillatory energy for producing output pulses which have substantially the same recurrence frequency as said synchronizing pulses, a phase comparator energized by said synchronizing pulses and said output pulses for deriving a fine frequency control voltage whose amplitude is representative of the difference in phase between said output pulses and said synchronizing pulses, said generator being maintained in frequency at a multiple of said synchronizing period in response to said coarse and fine frequency control voltages, third means energized by said synchronizing pulses and said electromagnetic waves for resetting said counters a fixed time after the arrival of each synchronizing pulse to a count corresponding to said fixed time, selection means adapted to be selectively connected to the output circuits of a portion of said coutners in accordance with the channel desired, said selection means being productive of an impulse corresponding in phase and duration to said desired channel, a gate circuit interposed between said input and output terminals and responsive to said impulse for effecting transmission of said desired channel between said input and output terminals.

6. An electronic commutated channel separator having input and output terminals and adapted to selectively and simultaneously transmit therebetween desired channels of communication in the form of pulses from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a coarse frequency control voltage which is a direct function of the period between successive synchronizing pulses, means for generating oscillatory energy, a counter chain comprising a plurality of counters and receptive of said oscillatory energy for producing output pulses which have substantially the same recurrence frequency as said synchronizing pulses, a phase comparator energized by said synchronizing pulses and said output pulses for deriving a fine frequency control voltage whose amplitude is representative of the difference in phase between said output pulses and said synchronizing pulses, said generator being maintained in frequency at a multiple of said synchronizing period in response to said coarse and fine frequency control voltages, third means energized by said synchronizing pulses and said electromagnetic waves for resetting said counters a fixed time after the arrival of each synchronizing pulse to a count corresponding to said fixed time, selection means adapted to be selectively connected to the output circuits of a portion of said counters in accordance with the channel desired, said selection means being productive of an impulse corresponding in phase and duration to said desired channels, mixer means for combining said impulses corresponding to said desired channels, a gate circuit interposed between said input and output terminals and responsive to the output of said mixer means for effecting transmission of said desired channels between said input and output terminals.

7. An electronic commutated channel separator having a pair of input terminals and a plurality of output terminals and adapted to selectively transmit therebetween desired channels of communication in the form of pulses from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a coarse frequency control voltage which is a direct function of the period between successive synchronizing pulses, means for generating oscillatory energy, a plurality of counter chains each comprising a plurality of counters, said counters being receptive of said oscillatory energy, one of said counter chains being adapted to produce output pulses which have substantially the same recurrence frequency as said synchronizing pulses, a phase comparator energized by said synchronizing pulses and said output pulses from said one of said counter chains for deriving a fine frequency control voltage whose amplitude is representative of the difference in phase between said output pulses and said synchronizing pulses, said generator being maintained in frequency at a multiple of said synchronizing period in response to said coarse and fine frequency control voltages, third means energized by said synchronizing pulses and said electromagnetic waves for resetting said counters a fixed time after the arrival of each synchronizing pulse to a count corresponding to said fixed time, a plurality of selecton means adapted to be selectively connected to the output circuits of a portion of said counters of said corresponding counter chains in accordance with the channels desired, each of said selection means being productive of an impulse corresponding in phase and duration to a desired channel, a plurality of gate circuits interposed between said input terminals and corresponding pairs of output terminals and responsive to said corresponding impulse for effecting transmission of said desired channels between said input terminals and said corresponding pairs of said output terminals.

8. An electronic commutated channel separator having input terminals and a plurality of pairs of output terminals and adapted to selectively transmit therebetween a desired channel of communication in the form of pulses from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a coarse frequency control voltage which is a direct function of the period between successive synchronizing pulses, means for generating oscillatory energy, a counter chain comprising a plurality of counters and receptive of said oscillatory energy for producing output pulses which have substantially the same recurrence frequency as said synchronizing pulses, a phase comparator energized by said synchronizing pulses and said output pulses for deriving a fine frequency control voltage whose amplitude is representative of the difference in phase between said output pulses and said synchronizing pulses, said generator being maintained in frequency at a multiple of said synchronizing period in response to said coarse and fine frequency control voltages, third means energized by said synchronizing pulses and said electromagnetic waves for resetting said counters a fixed time after the arrival of each synchronizing pulse to a count corresponding to said fixed time, selection means adapted to be selectively connected to the output circuits of a portion of said counters of said counter chain in accordance with the channels desired, said selection means being productive of impulses corresponding in phase and duration to said desired channels, and a plurality of gate circuits interposed between said input and output terminals and responsive to a corresponding impulse for effecting transmission of said desired channels between said input terminals and said corresponding pairs of output terminals.

9. An electronic commutated channel separator having input and output terminals and adapted to selectively transmit therebetween a desired channel of communication in the form of pulses from recurring multiple channel trains of signal pulses, each of said trains of pulses including a synchronizing pulse followed by a plurality of channel pulses, comprising means responsive to said synchronizing pulse for producing a first control voltage which is a direct function of the period between successive synchronizing pulses, means for generating oscillatory energy, a counter chain comprising a plurality of binary counters and receptive of said oscillatory energy for producing output pulses which have substantially the same recurrence frequency as said synchronizing pulses, a phase comparator energized by said synchronizing pulses and said output pulses for deriving a second control voltage whose amplitude is representative of the difference in phase between said output pulses and said synchronizing pulses, said generator being maintained in frequency at a multiple of said synchronizing period in response to said first and second control voltages, matrix means including a plurality of matrix elements adapted to be selectively connected to the output circuits of a portion of said binary counters in accordance with the channel desired, said matrix means being productive of an impulse corresponding in phase and duration to said desired channel, a gate circuit interposed between said input and output terminals and responsive to said impulse for effecting transmission of said desired channel between said input and output terminals.

10. An electronic commutated channel separator having input and output terminals and adapted to selectively and simultaneously transmit therebetween desired channels of communication in the form of pulses from recurring multiple channel trains of signal pulses, each of said trains of pulses including a synchronizing pulse followed by a plurality of channel pulses, comprising means responsive to said synchronizing pulses for producing a first control voltage which is a direct function of the period between successive synchronizing pulses, means for generating oscillatory energy, a counter chain comprising a plurality of binary counters and receptive of said oscillatory energy for producing output pulses which have substantially the same recurrence frequency as said synchronizing pulses, a phase comparator energized by said synchronizing pulses and said output pulses for deriving a second control voltage whose amplitude is representative of the difference in phase between said output pulses and said synchronizing pulses, said generator being maintained in frequency at a multiple of said synchronizing period in response to said first and second control voltages, matrix means including a plurality of matrix elements adapted to be selectively connected to the output circuits of a portion of said binary counters in accordance with the channels desired, said matrix means being productive of impulses corresponding in phase and duration to said desired channels, mixer means for combining said impulses corresponding to said desired channels, a gate circuit interposed between said input and output terminals and responsive to said mixer means for effecting transmission of said desired channels between said input and output terminals.

11. An electronic commutated channel separator having a pair of input terminals and a plurality of pairs of output terminals and adapted to selectively transmit therebetween desired channels of communication in the form of pulses from recurring multiple channel trains of signal pulses, each of said trains of pulses including a synchronizing pulse followed by a plurality of channel pulses, comprising means responsive to said synchronizing pulses for producing a first control voltage which is a direct function of the period between successive synchronizing pulses, means for generating oscillatory energy, a counter chain comprising a plurality of binary counters and receptive of said oscillatory energy for producing output pulses which have substantially the same recurrence frequency as said synchronizing pulses, a phase comparator energized by said synchronizing pulses and said output pulses for deriving a second control voltage whose amplitude is representative of the difference in phase between said output pulses and said synchronizing pulses, said generator being maintained in frequency at a multiple of said synchronizing period in response to said first and second control voltages, matrix means including a plurality of matrix elements adapted to be selectively connected to the output circuits of a portion of said binary counters in accordance with the channels desired, said matrix means being productive of impulses corresponding in phase and duration to said desired channels, and a plurality of gate circuits interposed between said input terminals and corresponding pairs of output terminals and responsive to a corresponding impulse for effecting transmission of said desired channels between said input terminals and said corresponding pairs of output terminals.

12. An electronic commutated channel separator having input and output terminals and adapted to selectively transmit therebetween a desired channel of communication in the form of pulses from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a coarse frequency control voltage which is a direct function of the period between successive synchronizing pulses, means for generating oscillatory energy, a counter chain comprising a plurality of binary counters and receptive of said oscillatory energy for producing output pulses which have substantially the same recurrence frequency as said synchronizing pulses, a phase comparator energized by said synchronizing pulses and said output pulses for deriving a fine frequency control voltage whose amplitude is representative of the difference in phase between said output pulses and said synchronizing pulses, said generator being maintained in frequency at a multiple of said synchronizing period in response to said coarse and fine frequency control voltages, third means energized by said synchronizing pulses and said electromagnetic waves for resetting said counters a fixed time after the arrival of each synchronizing pulse to a count corresponding to said fixed time, matrix means including a plurality of matrix elements adapted to be selectively connected to the output circuits of a portion of said binary counters in accordance with the channel desired, said matrix means being productive of an impulse corresponding in phase and duration to said desired channel, a gate circuit interposed between said input and output terminals and responsive to said impulse for effecting transmission of said desired channel between said input and output terminals.

13. An electronic commutated channel separator having input and output terminals and adapted to selectively and simultaneously transmit therebetween desired channels of communication in the form of pulses from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a coarse frequency control voltage which is a direct function of the period between successive synchronizing pulses, means for generating oscillatory energy, a counter chain comprising a plurality of binary counters and receptive of said oscillatory energy for producing output pulses which have substantially the same recurrence frequency as said synchronizing pulses, a phase comparator energized by said synchronizing pulses and said output pulses for deriving a fine frequency control voltage whose amplitude is representative of the difference in phase between said output pulses and said synchronizing pulses, said generator being maintained in frequency at a multiple of said synchronizing period in response to said coarse and fine frequency control voltages, third means energized by said synchronizing pulses and said electromagnetic waves for resetting said counters a fixed time after the arrival of each synchronizing pulse to a counter corresponding to said fixed time, matrix means including a plurality for matrix elements adapted to be selectively connected to the output circuits of a portion of said binary counters in accordance with the channels desired, said matrix means means being productive of impulses corresponding in phase and duration to said desired channels, mixer means for combining said impulses corresponding to said desired channels, a gate circuit interposed between said input and output terminals and responsive to said mixer means for effecting transmission of said desired channels between said input and output terminals.

14. An electronic commutated channel separator having a pair of input terminals and a plurality of pairs of output terminals and adapted to selectively transmit therebetween desired channels of communication in the form of pulses from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a coarse frequency control voltage which is a direct function of the period between successive synchronizing pulses, means for generating oscillatory energy, a counter chain comprising a plurality of binary counters and receptive of said oscillatory energy for producing output pulses which have substantially the same recurrence frequency as said synchronizing pulses, a phase comparator energized by said synchronizing pulses and said output pulses for deriving a fine frequency control voltage whose amplitude is representative of the difference in phase between said output pulses and said synchronizing pulses, said generator being maintained in frequency at a multiple of said synchronizing period in response to said coarse and fine frequency control voltages, third means energized by said synchronizing pulses and said electromagnetic waves for resetting said counters a fixed time after the arrival of each synchronizing pulse to a count corresponding to said fixed time, matrix means including a plurality of matrix elements adapted to be selectively connected to the output circuits of a portion of said binary counters in accordance with the channels desired, said matrix means being productive of impulses corresponding in phase and duration to said desired channels, and a plurality of gate circuits interposed between said input terminals and corresponding pairs of output terminals and responsive to a corresponding impulse for effecting transmission of said desired channels between said input terminals and said corresponding pairs of output terminals.

No references cited.